United States Patent [19]
Joseph

[11] Patent Number: 5,875,451
[45] Date of Patent: Feb. 23, 1999

[54] COMPUTER HYBRID MEMORY INCLUDING DRAM AND EDRAM MEMORY COMPONENTS, WITH SECONDARY CACHE IN EDRAM FOR DRAM

[75] Inventor: James Dean Joseph, Monument, Colo.

[73] Assignee: Enhanced Memory Systems, Inc., Colorado Springs, Colo.

[21] Appl. No.: 615,392

[22] Filed: Mar. 14, 1996

[51] Int. Cl.$^6$ ..................................................... G06F 12/08
[52] U.S. Cl. ......................... 711/105; 711/118; 711/142; 711/202
[58] Field of Search ................................. 711/105, 118, 711/142, 3, 202

[56] References Cited

U.S. PATENT DOCUMENTS

| | | | |
|---|---|---|---|
| 5,361,391 | 11/1994 | Westberg | 711/137 |
| 5,408,636 | 4/1995 | Santeler et al. | 711/163 |
| 5,699,317 | 12/1997 | Sartore et al. | 365/230.06 |
| 5,721,828 | 2/1998 | Frisch | 395/200.47 |

OTHER PUBLICATIONS

J. Handy, *The Cache Memory Book*, ©1993 Academic Press, Inc., San Diego, California, pp. 37–106, 125–190.

*Primary Examiner*—Reginald G. Bragdon
*Attorney, Agent, or Firm*—William J. Kubida, Esq.; Carol W. Burton, Esq.; Holland & Hart LLP

[57] ABSTRACT

A computer system with a hybrid main memory which includes both EDRAM and DRAM, with a DRAM cache provided within a designated portion of the EDRAM portion of the main memory. Read requests are handled by copying data being read from DRAM into a cache portion of EDRAM under the direction of a pseudo cache controller and decoder which converts the DRAM address to a EDRAM address corresponding to the cache location of EDRAM. Read "hit" requests are responded to by reading data directly from the cache portion of EDRAM. Write requests to DRAM are, for purposes of cache coherency when a copy of the address being written to is present in the EDRAM cache portion, accomplished by writing data both to DRAM and overwriting the stale data existing in the cache portion of EDRAM.

23 Claims, 8 Drawing Sheets

Fig. 6 WRITE HIT TO DRAM

Fig. 7

Fig. 8 WRITE TO EDRAM

COMPUTER HYBRID MEMORY INCLUDING DRAM AND EDRAM MEMORY COMPONENTS, WITH SECONDARY CACHE IN EDRAM FOR DRAM

BACKGROUND OF THE INVENTION

1. Field of the Invention

This invention relates to improvements in computer systems, or the like, and more particularly to improvements in memory management hardware and techniques, and still more particularly to improvements in methods and apparatuses for providing a computer system containing both dynamic random access memory (DRAM) and enhanced dynamic random access memory (EDRAM) components, and still yet more particularly to providing a computer system having a combined cache for both DRAM and EDRAM components of a combined memory.

2. Background of the Invention

The performance of computer central processing units (CPUs) has increased dramatically in recent years, exceeding that of corresponding increases in the performance of the DRAM devices typically used in conjunction with such computer CPUs. Not until the introduction of cache memory techniques was the performance of systems with DRAM main memory improved. This performance improvement was achieved by making a high speed, locally accessed copy of all or part of the contents of the DRAM main memory available to the CPU in high speed memory devices, so that even during memory accesses the CPU did not always need to operate at the slower speeds of the system bus or the DRAM main memory.

Such caching methods of memory management are typically implemented with a secondary cache for the DRAM main memory (sometimes referred to as an "L2" cache.) The advantages of caching are made possible by virtue of the fact that many of the memory accesses by the CPU are in highly repetitive memory address spaces. Typically, once the repetitive address spaces are copied from the memory to the cache, they can be utilized through many bus cycles before needing to be updated with the contents of subsequent memory addresses to be accessed. Memory caching is advantageous particularly for read cycles of the computer, which, in contrast to the write cycles, constitute 90% of the external accesses of the CPU.

The most popular hardware realization of a cache memory system incorporates a high speed SRAM cache and a slow, less expensive DRAM main memory. The DRAM main memory is usually located on the system bus, and the SRAM cache is usually provided by a cache chip set located on a local bus. The chip set provides a cache directory, a cache controller, and a cache memory. The cache directory is connected to the local address bus by tag (upper address bit) lines and set (lower address bit) lines, and contains a list of main memory addresses which are copied to the cache data memory. The cache directory is also connected to the cache controller, which implements the algorithm to move data into and out of the cache data memory and the cache directory. The cache data memory, which is connected to the local bus, provides a fast memory, usually SRAM, used to store replicas of selected data from the main memory.

In addition, recently EDRAM devices have been introduced to eliminate the external SRAM caching facility in computer systems. EDRAMs are enhanced DRAM devices that incorporate both SRAM and DRAM devices onto a single chip, and are described in greater detail below.

To date, the lack of a suitable caching system that includes both DRAM and EDRAM components has retarded development of low cost hybrid main memory systems combining the speed advantages of EDRAM with the cost advantages of DRAM. What is needed, therefore, is a way to combine DRAM and EDRAM memory components, while at the same time realizing the caching benefits of EDRAM over the entire memory map.

SUMMARY OF THE INVENTION

The invention provides a hybrid main memory comprising both EDRAM and DRAM memory portions. The hybrid memory does not require the use of a secondary cache, using most of the EDRAM as a portion of main memory. The remainder of the EDRAM that is not used as main memory acts as a secondary cache for the DRAM portion of main memory. This allows the DRAM portion of main memory to retain the performance of a DRAM+cache section, while having a minimal impact on the EDRAM memory. In widely-used "DOS" operating systems, the portion of the EDRAM used for DRAM secondary cache is actually "free", because a segment of lower memory is often mapped into adapter ROM and is wasted. This space can be reclaimed as a DRAM secondary cache.

According to a broad aspect of the invention, a memory device is provided which has first memory components, which may be DRAM devices, mapped into first main memory address locations, and an EDRAM having an integrated EDRAM cache and a dynamic memory array. The EDRAM is of the type in which when the EDRAM is addressed, data is read from the EDRAM cache if it is contained in the EDRAM cache, and moved to and read from the EDRAM cache if it is not contained in the EDRAM cache. The EDRAM has at least some dynamic memory array addresses mapped into second main memory address locations, and at least some other dynamic memory array addresses allocated as a secondary cache for the first memory components. A secondary cache controller is provided for addressing the secondary cache if data to be read from the first memory components is contained in the secondary cache, and to move the data to be read from the first memory components to the secondary cache if the data is not contained in the secondary cache, then to address the secondary cache. Thus, the data to be read from the first memory components is read from the EDRAM cache.

The secondary cache controller has a secondary cache directory for containing addresses of data in the first memory components that are also contained in the secondary cache, and a decoder for mapping addresses of the first memory components to addresses of the secondary cache. The secondary cache also has a circuit for applying addresses within the second main memory address locations directly to the EDRAM.

In one embodiment, some of the dynamic memory array of the EDRAM are mapped from 0 to 640 Kbytes and from 1 to 4 Mbytes, and the first memory components are mapped from 4 to 8 Mbytes. The secondary cache is located in a portion of main memory between 640 Kbyte and 1 Mbyte. In another embodiment, the memory array addresses of the EDRAM overlap an address region in which at least some of the first memory components are mapped.

According to another broad aspect of the invention, a method is provided for providing a main memory for a computer. The method includes mapping first memory components into first main memory address locations. At least some dynamic memory array addresses of an EDRAM are mapped into second main memory address locations, and at least some other dynamic memory array addresses of an EDRAM are allocated to a secondary cache for the first memory components. The secondary cache is addressed if data to be read from the first memory components is contained in the secondary cache, and data to be read from the first memory components is moved to the secondary cache if the data is not contained in the secondary cache before it is addressed.

A secondary ache directory is also provided for containing addresses of data in the first memory components that are also contained in the secondary cache. Also, addresses of the first memory components are mapped to addresses of the secondary cache, whereas, addresses within the second main memory address locations are addressed directly to the EDRAM.

According to another broad aspect of the invention, a computer system is provided which has a CPU and a main memory. The computer system includes first memory components mapped into first main memory address locations and an EDRAM having an integrated EDRAM cache and a dynamic memory array for reading data from the EDRAM cache when the data is contained in the EDRAM cache, and for moving the data to the EDRAM cache then reading the data from the EDRAM cache when the data is not contained in the EDRAM cache. The EDRAM has at least some dynamic memory array addresses mapped into second main memory address locations, and at least some other dynamic memory array addresses allocated as a secondary cache for the first memory components. A secondary cache controller is provided for addressing the secondary cache if data to be read from the first memory components is contained in the secondary cache, and to move the data to be read from the first memory components to the secondary cache if the data is not contained in the secondary cache, then to address the secondary cache. Thus, the data to be read from the first memory components is read from the EDRAM cache.

According to yet another broad aspect of the invention, a method for providing a caching capability for the DRAM, is provided, the DRAM forming a part of a main memory for use in a computer system having a central processing unit operatively associated therewith. The main memory has addresses designating data stored in a DRAM and addresses designating data stored in an EDRAM. The method includes designating a portion of the EDRAM addresses as a cache portion for the DRAM, and responding to a request to read data from a specific DRAM address by reading the data from the cache portion if the data is contained in the cache portion, and by copying the data to the cache portion if the data is not contained in the cache portion. The method may further include responding to a request to write data to a specific DRAM address by writing the data to the specific DRAM address and by writing the data to the cache portion.

BRIEF DESCRIPTION OF DRAWINGS

The invention is illustrated in the accompanying drawings, in which.

In the various figures of the drawings, like reference numerals denote like or similar parts.

DETAILED DESCRIPTION OF THE PREFERRED EMBODIMENT

According to a preferred embodiment of the invention, a memory system combining both DRAM and EDRAM devices is disclosed. The combined, or hybrid, memory system provides a cache to service both EDRAM and DRAM portions of the hybrid memory. Since DRAM memory accesses take approximately twice the time of EDRAM accesses, by providing a cache that services both EDRAM and DRAM, the performance gap is significantly narrowed.

Figure 1:
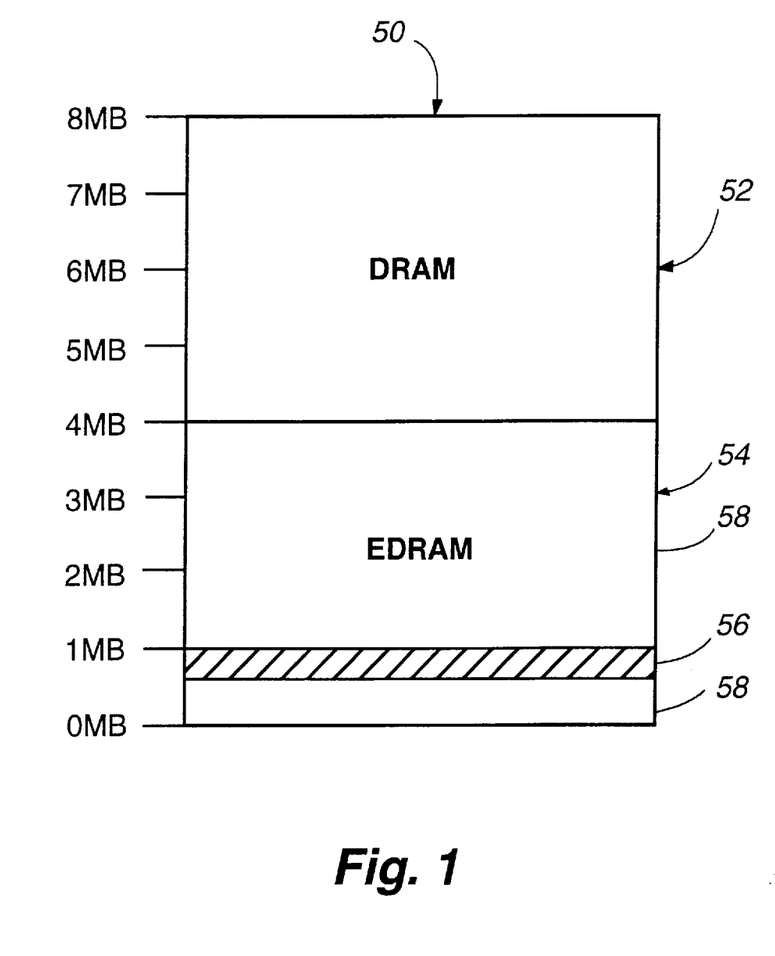
FIG. 1 is a memory map of a hybrid DRAM and EDRAM memory with a combined cache, according to a preferred embodiment of the invention.

A memory map of the hybrid memory 50 that includes both a DRAM 52 and an EDRAM 54 is shown in FIG. 1. In the embodiment of the hybrid memory illustrated, the EDRAM 54 of the hybrid memory 50 is mapped to main memory addresses from 0–4 Mbytes, (except for memory addresses between 640 Kbytes and 1 Mbyte, which are devoted to I/O functions and ROM space). The DRAM 52 of the hybrid memory 50 is mapped to addresses from 4–8 Mbytes. Since the 640 Kbytes to 1 Mbyte region within the EDRAM 54 is usually not useful as main memory, a portion may be used to provide a block or sector 56 which can be mapped to provide a secondary cache for the DRAM 52. The utilization of this secondary cache from within the EDRAM allows the provision of a unified high speed cache to both the DRAM and the EDRAM, utilizing the inherent onboard caching feature of the EDRAM.

Figure 2:
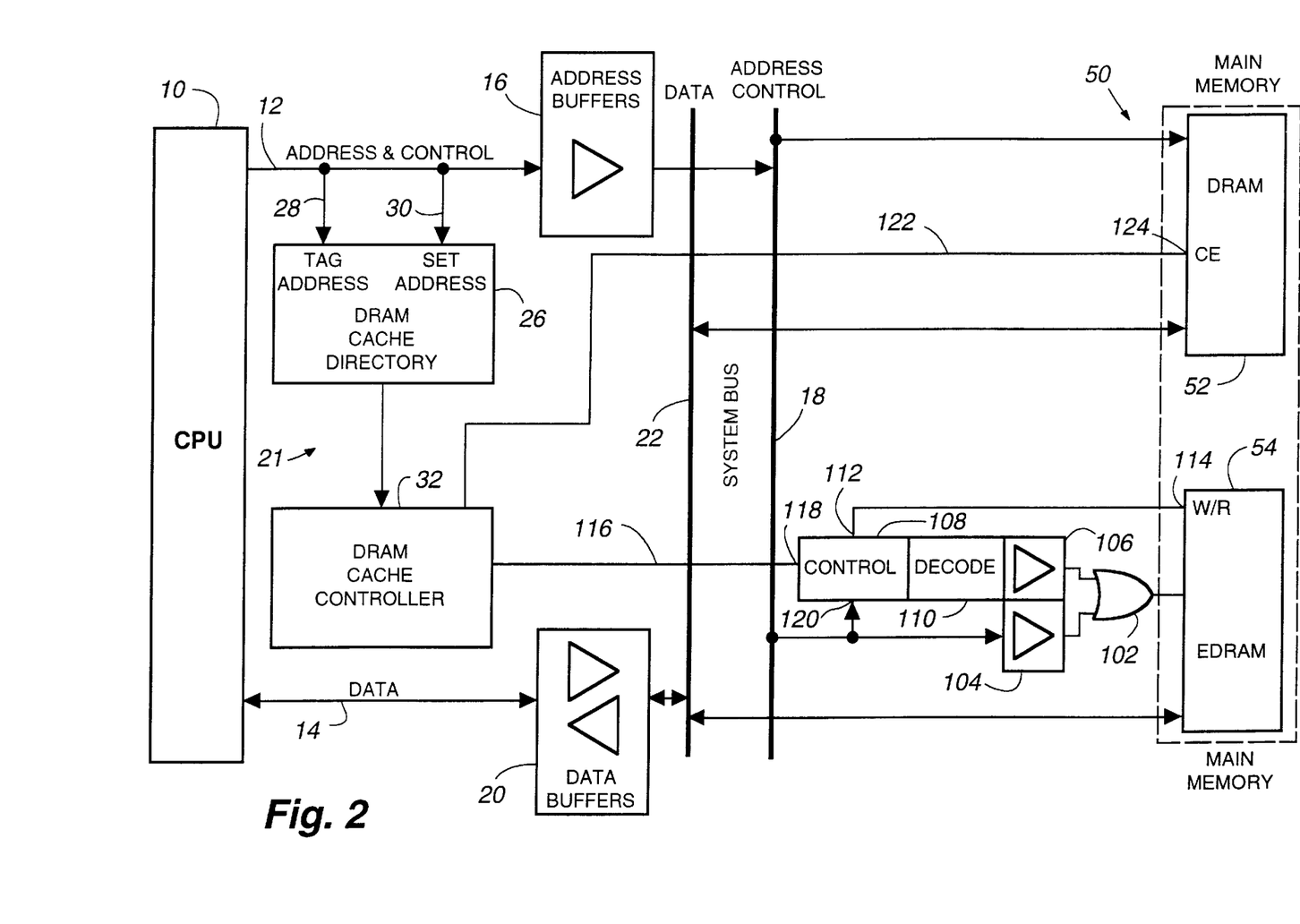
FIG. 2 is a hardware block diagram of a computer system having a hybrid DRAM and EDRAM memory, according to a preferred embodiment of the invention.

It should be observed that the particular addresses of the EDRAM and the DRAM on the memory map shown in FIG. 2 are not critical, nor is the exact address of the designated secondary cache block 56 in the EDRAM 54. The allocation shown in FIG. 2 provides, however, a cache in the upper memory portion of the memory map that is often unused in "DOS" operating systems. Thus, in a standard "DOS" operating system, the specific selection of the DRAM cache addresses shown may be particularly useful if upper memory is not used for another purpose. If it is, an alternate secondary cache area 56 can be easily designated. For example, the EDRAM might be arranged in the lower 8 Mbytes, with the dividing line between EDRAM and DRAM arranged at 6 Mbytes, and with the region between 6 Mbytes and 8 Mbytes in the EDRAM allocated for use as the secondary cache for the DRAM.

Moreover, the actual size of the secondary cache in the EDRAM can vary depending on the application. In a '486 or Pentium system running in a "DOS" operating system, for instance, the total space available (as in the embodiment described herein) may be 384 Kbytes. However, even though most systems would use a portion of that memory space as a shadow RAM, at least 128 Kbytes would be available. This would provide a substantial improvement in DRAM performance. In a non-'486 system, the upper memory boundary for the EDRAM could be adjusted to overlap the DRAM region. With that upper space in the EDRAM serving as the DRAM cache, the space available could be 1 Mbyte, or more.

Additionally, it should be noted that although the non-EDRAM memory portion of the hybrid memory 50 is denoted as "DRAM", as it would be in most personal computers, computer workstations, or the like, other types of memory elements may be equally advantageously employed. For example, the DRAM portion 52 of the hybrid memory may include SRAMs, quantum well memories, EEPROMs, or memory components of other types. As will become apparent, however, one of the advantages provided by the hybrid memory of the invention is that existing DRAM controller chip sets currently provided in most computer systems (without a separate SRAM cache memory) can be used to perform a portion of the control functions associated with providing an EDRAM cache for the DRAM portion of main memory.

It should be observed that the EDRAM 54 of the hybrid memory 50 may include enhanced DRAM devices that incorporate both SRAM and DRAM devices onto a single chip, examples thereof being described in "Ramtron Specialty Memory Products Data Book," October, 1994, incorporated herein by reference, and available from Ramtron International Corporation, 1850 Ramtron Drive, Colorado Springs, Colo. 80921.

A typical EDRAM is physically similar to a standard page mode or static column DRAM with the addition of an integrated SRAM cache and an internal controller, which allows the EDRAM to operate much like page mode or static column DRAM. The cache of the EDRAM is tightly coupled with the memory array as row registers, and memory reads always occur from the cache. When the internal comparator detects a page "hit", only the SRAM cache is accessed and data is available at the column address. This results in a significant decrease in memory access times. When a page read "miss" is detected, the new memory array row is loaded into the cache and data is made available at the output. Subsequent reads within the page (burst read, local instructions or data) can continue at fast cycle times.

In operation, the EDRAM compares a new row address to the address of the row last read, which is latched in a register. If the row addresses match, the requested data is already in the SRAM cache, and no DRAM memory reference is initiated. The data specified by the column address is then made available at the output pins. On the other hand, if the new row address and last row read address do not match, the requested data is not in the SRAM cache. The data contained in the new row address must then be fetched from the DRAM and placed in the SRAM cache. The fetched data at the specified column address is then made available at the output.

Since reads occur from the cache, the memory array precharge can occur concurrently without degrading performance. The on chip refresh counter, with an independent refresh bus, allows the EDRAM also to be refreshed during cache reads.

On the other hand, memory writes are internally posted and are directed to the DRAM array. During a write "hit", the on chip comparator activates a parallel write path to the cache to maintain coherency. As will become apparent, the memory embodiment of the present invention combines an EDRAM and ordinary DRAM into a combined, or hybrid, main memory.

A basic hardware block diagram of a preferred embodiment of the invention is shown in FIG. 2. A CPU 10, which may be, for example, a 80486, or other suitable processor, is connected to a local bus having address and control lines 12 and data lines 14. The local address and control lines 12 are connected to the system bus address and control lines 18 by address and control buffers 16. The local data lines 14 are similarly connected to the system bus data lines 22 by data buffers 20.

The system bus data lines 22 and address and control lines 18 are connected to the hybrid main memory 50, which has both a DRAM 52 and an EDRAM 54. The connections of the DRAM 52 of the hybrid memory 50 to the system bus data lines 22 and address and control lines 18 are in a conventional manner. The connections of the EDRAM 54 of the hybrid memory 50 to the system bus data lines 22 and address and control lines 18 also are in a conventional manner for an EDRAM, except as below described. It should be noted that an EDRAM controller (not shown) generally associated with EDRAM devices also may be required, and which may be connected in a conventional manner.

On the other hand, the connections of the EDRAM 54 to the system buses 18 and 22 to provide the DRAM caching ability of the present invention are established by an EDRAM-cache control unit 108, which determines whether an address found on the system address lines 18 is piped directly into the EDRAM 54 or decoded by an address decoder 110 before being applied to the EDRAM 54. The EDRAM-cache control unit 108 also determines whether an address and accompanying data is processed as a read or write. Thus, the EDRAM-cache control unit 108 has a control connection 112 connected to a W/R input 114 of the EDRAM to control the EDRAM to process either a read or write function.

Address buffers 106 and 104 are provided to receive respectively decoded addresses from the address decoder 110 and from the system bus address and control lines 18, to provide addresses to OR gates 102, which are connected to address inputs of the EDRAM portion 54 of the hybrid memory 50.

The EDRAM-cache control unit 108 receives a cache controller signal input 118, which is connected to the DRAM cache controller 32 by line 116. Thus, the EDRAM controller 108 and decoder 110 serve to apply addresses to the EDRAM 54 of the hybrid memory 50 directly from the system bus address and control lines 18 via buffers 104, if the addresses are in the address range of the EDRAM. If the addresses, on the other hand, are in the address range of the DRAM, the addresses are decoded by the decoder 110 and applied to the DRAM cache 56 of the EDRAM 54 via the buffers 106.

More particularly, an address having upper address bits in the 4–8 Mbyte range of the DRAM 52 is remapped to an address having upper address bits corresponding to addresses of the DRAM cache 56. On the other hand, if an address on the system bus address and control lines 18 is an EDRAM address, in this case in the 0–4 Mbyte range, then it is sent, without decoding, directly to EDRAM 54.

To control the caching operation of the DRAM 52 of the hybrid memory 50, a standard DRAM cache chip set 21 is provided; however, since the DRAM cache is provided by a block of the EDRAM 54, there is no need to provide a separate cache memory for the DRAM. The DRAM chip set 21 includes a DRAM cache directory 26, which is connected to the local bus address lines 12 via the "tag" and "set"

address lines 28 and 30. The DRAM cache directory 26 contains a list of the memory addresses of the DRAM 52 of the hybrid memory 50 that contain data stored in the DRAM cache 56. The DRAM cache directory 26 is connected to the DRAM cache controller 32, and is responsible for implementing an algorithm to initiate the process of moving data into and out of the DRAM cache portion of the EDRAM. The DRAM cache controller 32 is connected via line 122 to the chip select or enable input 124 of the DRAM 52.

The DRAM cache controller 32 is programmed to send one of three signals along line 116. With respect to any addresses on the local bus 12 connected with either a read or a write to the DRAM cache portion of the EDRAM, a NOP signal is sent on line 116 from the DRAM cache controller 32 to the EDRAM-cache control unit 108, indicating that a system bus address in an unmapped form is piped directly to the EDRAM 54. An address on the system bus address line 18 that is directed to DRAM 52 will result in either a "hit" or a "miss" signal being sent from the DRAM controller 32 on signal line 116 to the EDRAM-cache control unit 108. This signal is processed by the EDRAM-cache control unit 108, which maintains the cache policy for the DRAM cache 56. A "hit" occurs when the DRAM cache directory determines that particular set of tag and set addresses is found in the DRAM cache directory, indicating that the address is to be found in DRAM cache, and a "miss" occurs when the DRAM cache directory determines that particular set of tag and set addresses is not found in the DRAM cache directory, indicating that the address is not to be found in the DRAM cache. It should be noted that the support chipset 21 can be programmed to match the cache signal timing to the EDRAM speed. For reads on a 33-MHz '486 μP, for example, 3:1:1:1 cache timing would correspond to all read misses from the EDRAM. This would be considerably faster than 5:2:2:2 timing that would correspond to a DRAM with no secondary cache. With cache hits, the support chipset would return the timing signals to the CPU.

The processes connected with the cache policy shown in the embodiment illustrated are shown in FIGS. 3–8. The cache policies implemented therein are with respect to read operations best characterized as a "set associate" of cache in which each hybrid memory location is mapped to a DRAM cache location corresponding to that specific memory location. The write policy is best described as a "write through" policy in which a write request is directed to hybrid memory and, if necessary to maintain coherency, with the DRAM cache. Coherency is maintained by writing both to the specific hybrid memory location and to the DRAM cache location holding data corresponding to that hybrid memory address. Cache coherency is a term given to the problem of assuring the contents of cache memory and those of hybrid memory for all caches are either identical or under tight enough control that stale and current data are not confused with each other. The term stale data is used to describe data locations which no longer reflect the current value of memory location they once represented. The cache will only update those cache locations which contain the same address as that being updated in the hybrid memory. Other cache policies, for example, "write-back", can be implemented utilizing the basic design set forth herein, provided of course that the DRAM chip set supports them.

In operation, ROM accesses in the 640 Kbyte to 1 Mbyte region are handled without using the DRAM 52 or, in most cases, the EDRAM 54. If shadowing of ROM is done, portions of the EDRAM will be used in this region and cannot be devoted to DRAM cache. Most memory accesses in the 640 Kbyte to 1 Mbyte region are ignored by the EDRAM memory controller, as are reads and writes that involve I/O ports.

The caching operation of the hybrid memory 50 is explained below with regard to read "miss" and "hit" requests directed to the DRAM 52, write "hit" and "miss" requests directed to the DRAM 52, and read and write requests directed to the EDRAM 54.

Figure 3:
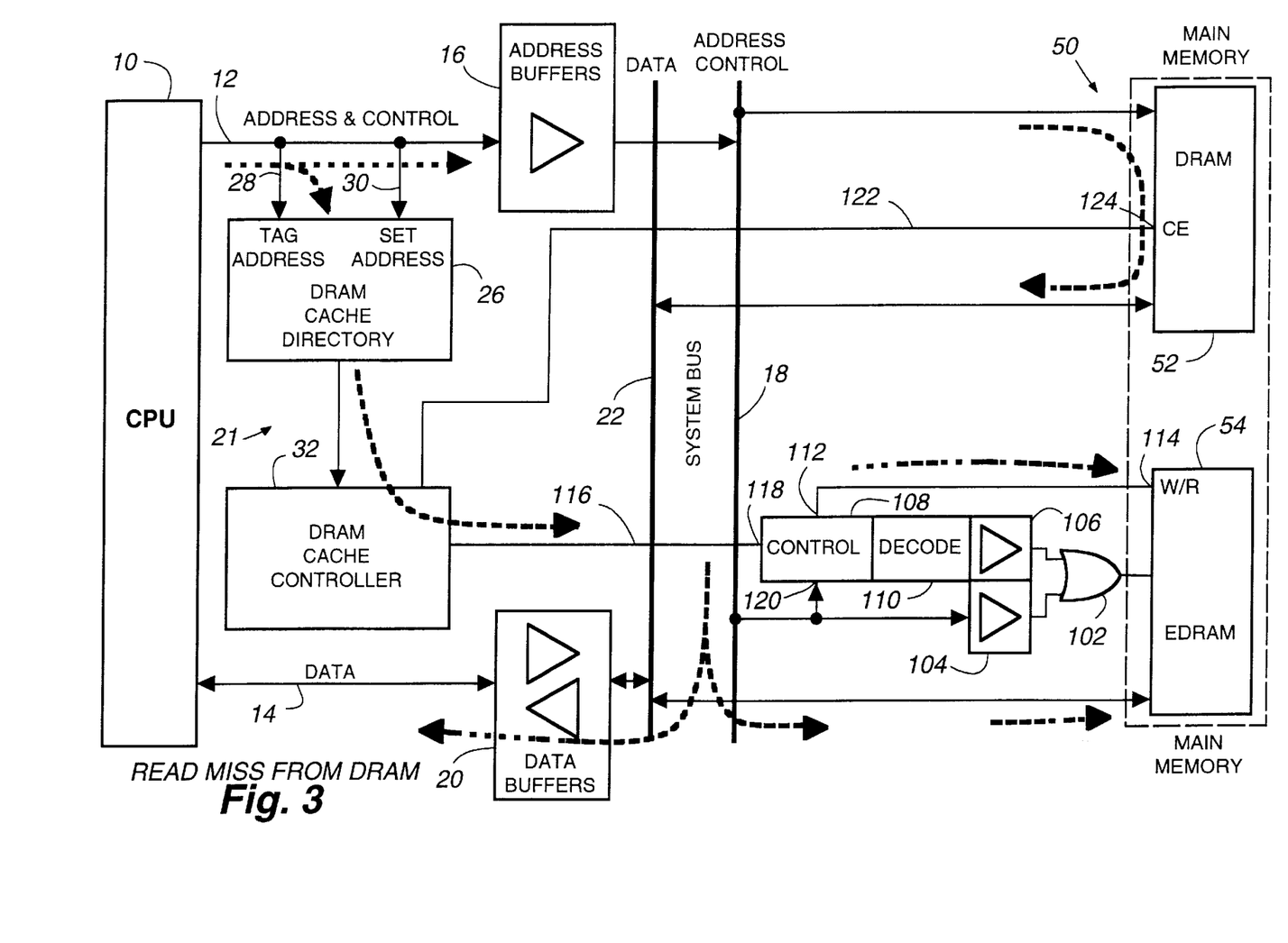
FIG. 3 is the hardware block diagram of the computer system of FIG. 2 showing the operation of the system resulting from a read miss from the DRAM.

More particularly, the processing of a read "miss" request directed to the DRAM 52 is illustrated in FIG. 3. An address on the local bus address lines 12 is applied to the DRAM cache directory 26. If the particular set of "tag" and "set" addresses is not found in the DRAM cache directory, i.e., is not in the DRAM cache, then the DRAM controller 32 initiates a DRAM access by selecting the DRAM chip enable line 122 to the DRAM chip select or enable input 124. The DRAM controller 32 signals the EDRAM-cache control unit 108 with a "miss" signal on line 116 that the data to be read is not in the DRAM cache 56. The address buffers 16 are enabled and provide the DRAM read command and address to both the DRAM 52 and to the EDRAM-cache control unit 108 via the address and control input 120. The EDRAM-cache control unit 108 and decoder 110 decode the upper bits of the address and send the decoded address via decoded address buffers 106 and OR gates 102 to the address inputs of the EDRAM 54.

The decoded address corresponds to the location of the EDRAM DRAM cache 56 to which the data read from the DRAM is copied. The EDRAM-cache control unit 108, in response to the combination of a read command and a DRAM address signal at input 120 and a "miss" signal on line 116, transforms the system bus read signal into a write signal to the W/R control input 114 of the EDRAM 54. This combined EDRAM and DRAM operation provides the data to be read from DRAM and also copies it to the DRAM cache 56. Therefore, when a subsequent request is made for data from the same address, that data is available both from the DRAM 52 and the DRAM cache 56.

Figure 4:
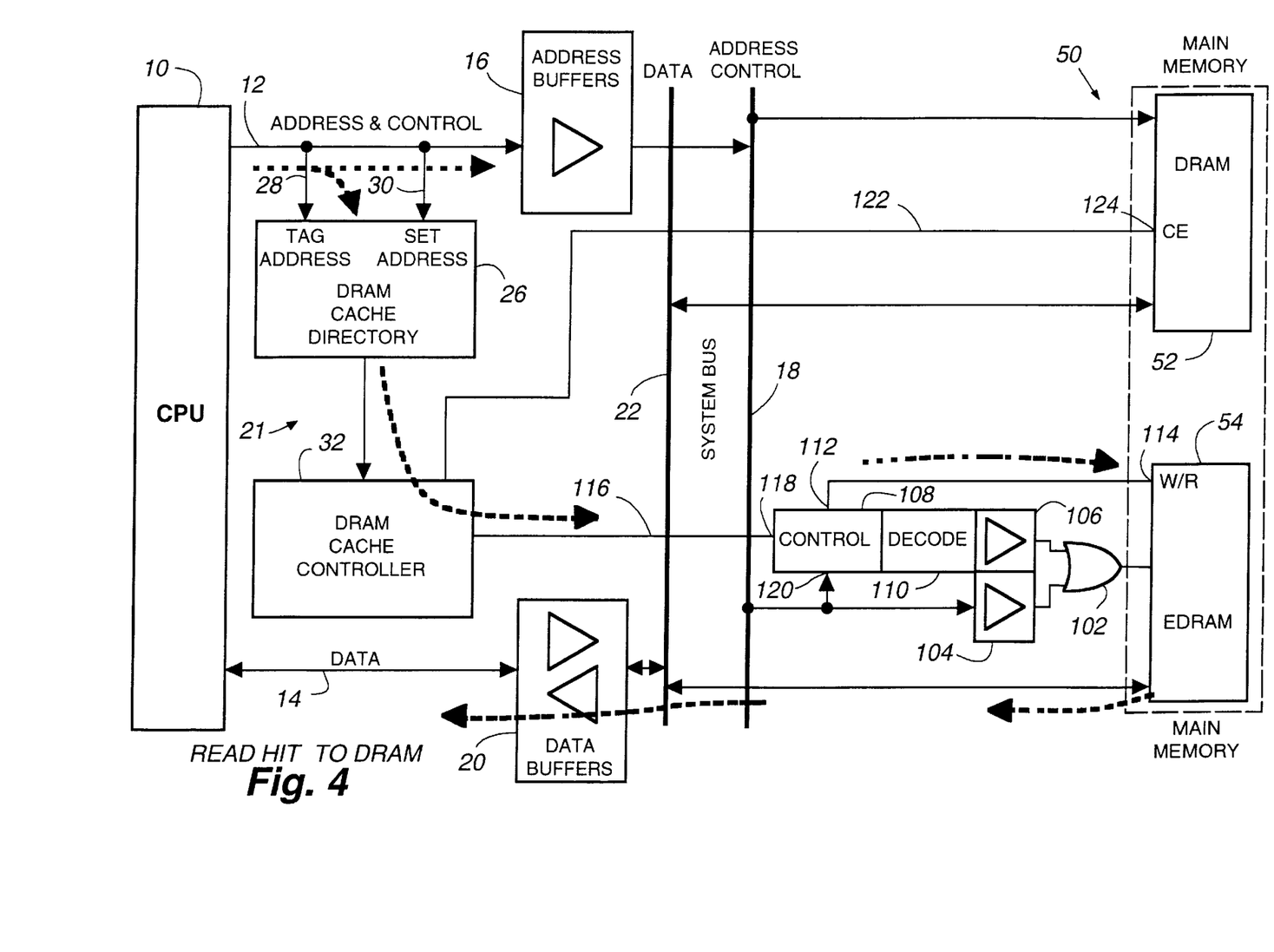
FIG. 4 is a hardware block diagram of the computer system of FIG. 2 showing the operation of the system resulting from a read hit to the DRAM.

The processing of a read "hit" directed to the DRAM 52 is shown in FIG. 4. The address applied to the DRAM cache directory 26 on the local bus address lines 12 is a DRAM 52 address. The directory 26 indicates that the data at that address is available both from the DRAM cache 56 and the DRAM 52 of the hybrid memory 50. The DRAM cache controller 32 simultaneously disables the DRAM 52 via line 122, and sends a "hit" signal on line 116 to the DRAM cache control input 118. Responsive to the combination of a "hit" signal at input 118 and a DRAM address and read command at input 120, the EDRAM-cache control unit 108 and decoder 110 enables the decoded address buffers 106 and disables the address buffers 104, to provide a decoded DRAM cache 56 address to the EDRAM address inputs via OR gate 102. The EDRAM-cache control unit 108 passes a read command to the EDRAM W/R input 114. Thereupon the EDRAM 54 reads from the DRAM cache 56 to provide the cached data to system bus data lines 22. In this particular case, no access to the DRAM is required, because the data requested was available in DRAM cache 56. Typically, the access times for an EDRAM access are 7 clock cycles, compared to approximately 13 clock cycles required to access data from a normal DRAM.

Figure 5:
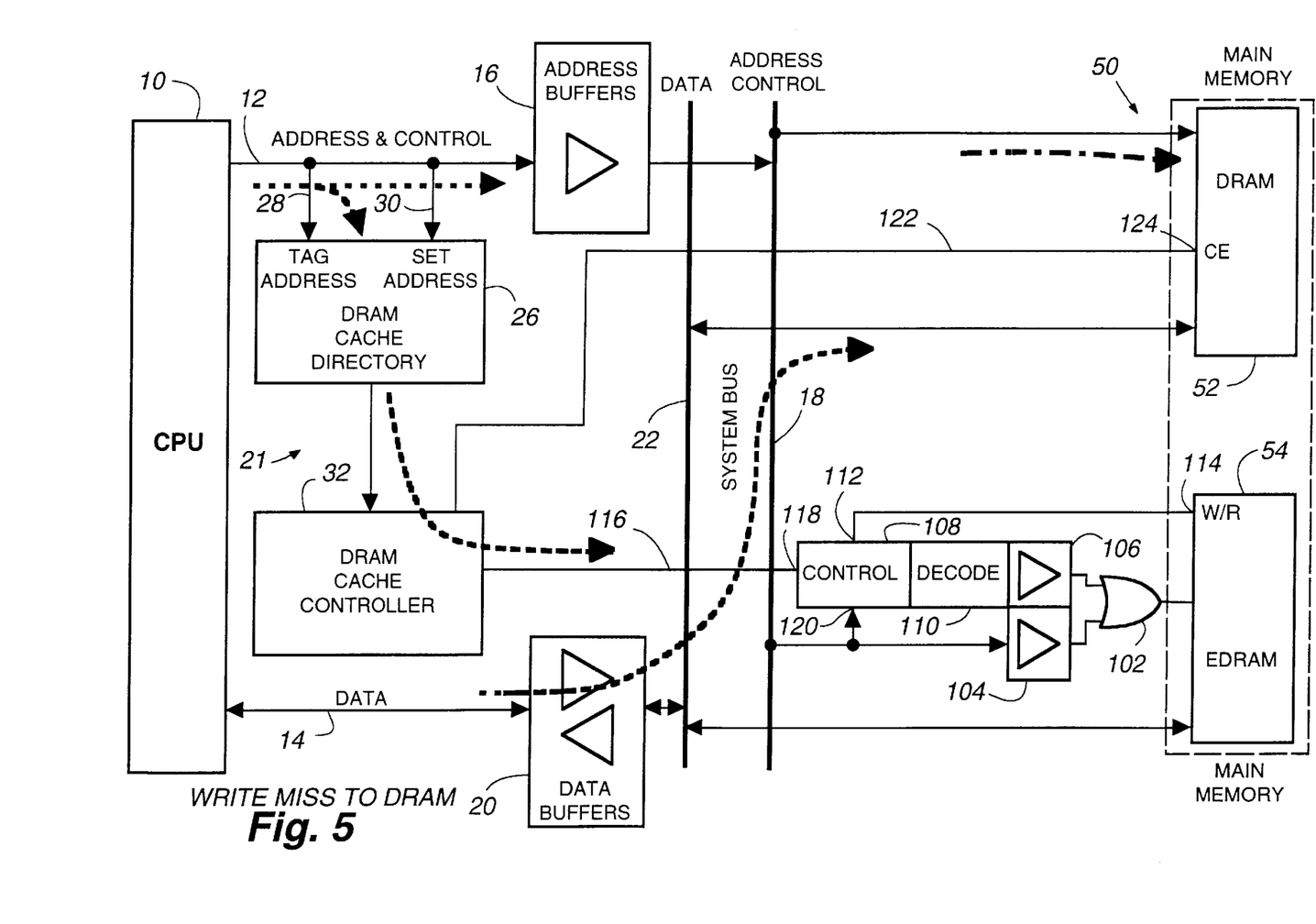
FIG. 5 is a hardware block diagram of the computer system of FIG. 2 showing the operation of the system resulting from a write miss to the DRAM.

The processing of a write operation to the DRAM 52 that results in a write "miss" is illustrated in FIG. 5. The DRAM address sought to be written to is applied to the DRAM cache directory 26 from the local bus address lines 12. From the DRAM cache directory 26, it is determined that no corresponding data is present in the DRAM cache 56. The DRAM cache controller 32 then enables the DRAM 52 with an enable signal on line 122, and data on the system bus data line 22 is written to the DRAM 52. The DRAM cache controller 32 also sends a "miss" signal on the line 116 to the EDRAM-cache control unit 108. The EDRAM-cache control unit 108, in response, disables both decoded address buffers 106 and address buffers 104, thereby preventing any write activity to the EDRAM 54.

Figure 6:
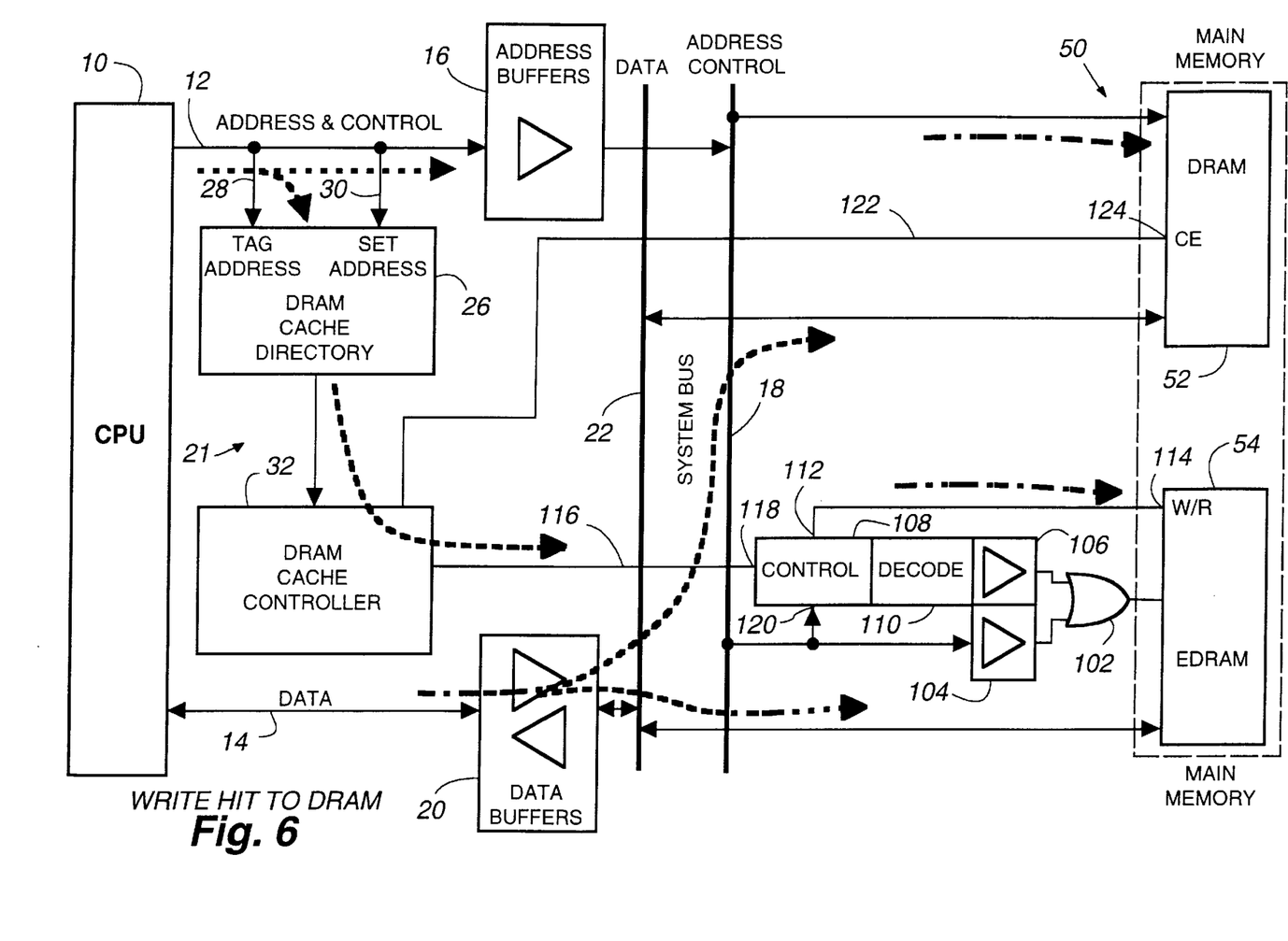
FIG. 6 is a hardware block diagram of the computer system of FIG. 2 showing the operation of the system resulting from a write hit to the DRAM.
Figure 7:
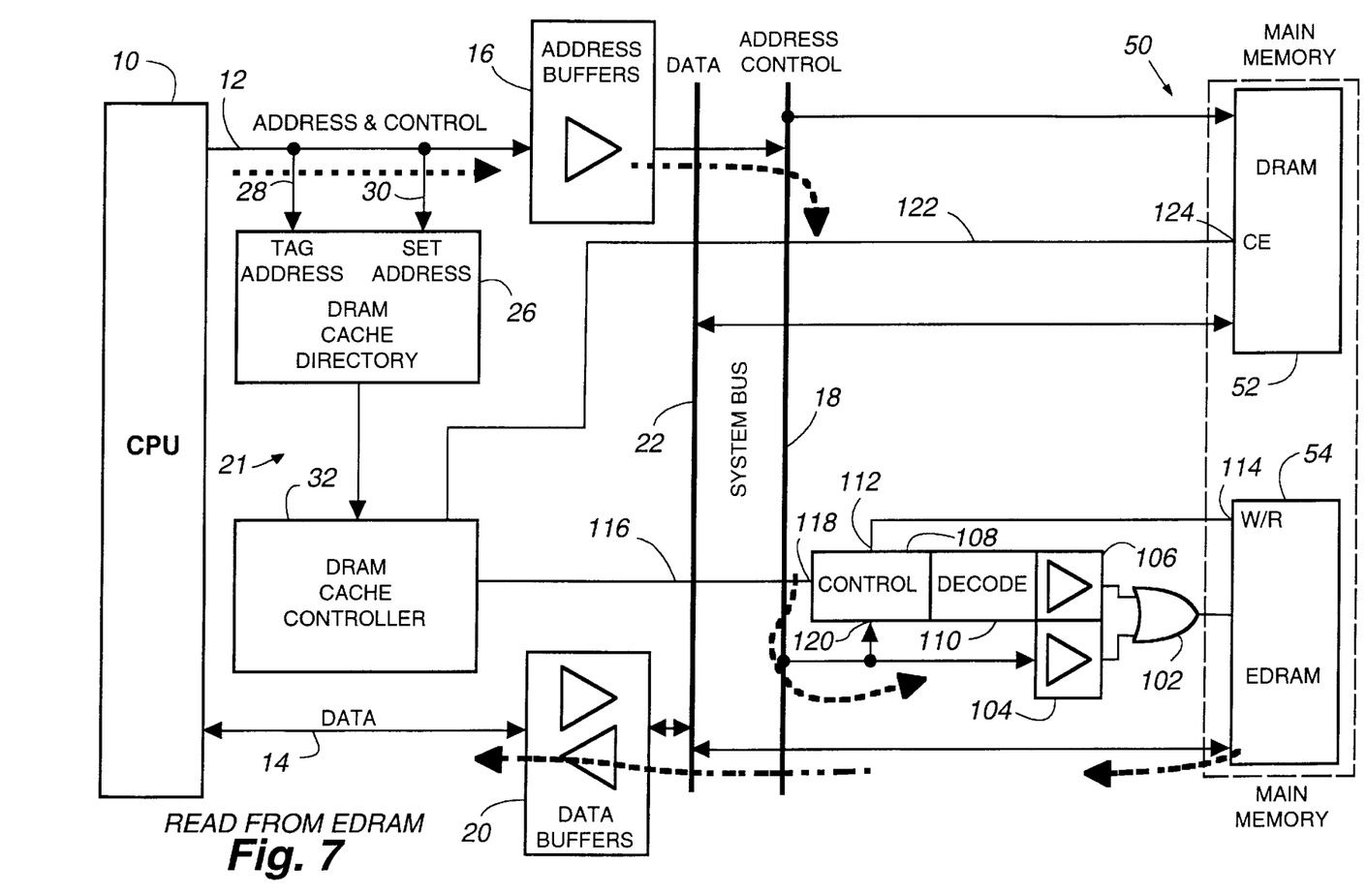
FIG. 7 is a hardware block diagram of the computer system of FIG. 2 showing the operation of the system resulting from a read from the EDRAM.

The write through caching policy is shown in FIG. 6, to which reference is now made. An address provided on the local bus address lines 12 is applied to the DRAM cache directory 26 which determines that data is sought to be written to an address which is located both in the DRAM 52 and in the DRAM cache 56 of the EDRAM 54. Accordingly, the DRAM controller 32 sends a "hit" signal on line 116 to the DRAM cache controller and enables the DRAM 52 chip select 124 via line 122. In response, the EDRAM-cache control unit 108 issues a write command to the W/R input 114 of the EDRAM 54, enables the decoded address signal output buffers 106, and disables the address signal output buffers 104. The EDRAM decoder 110 then decodes the address available at the address and command signal input 120, and passes the decoded address to the address inputs of the EDRAM 54. With an address applied to both the DRAM 52 and the EDRAM 54, the data on the system bus 22 is written both to DRAM and to the DRAM cache 56 in the EDRAM 54 (which contains the stale data corresponding to the DRAM address being written to). Cache coherency is therefore maintained because data associated with a given address in both DRAM cache and DRAM memory are maintained in identical states.

Figure 8:
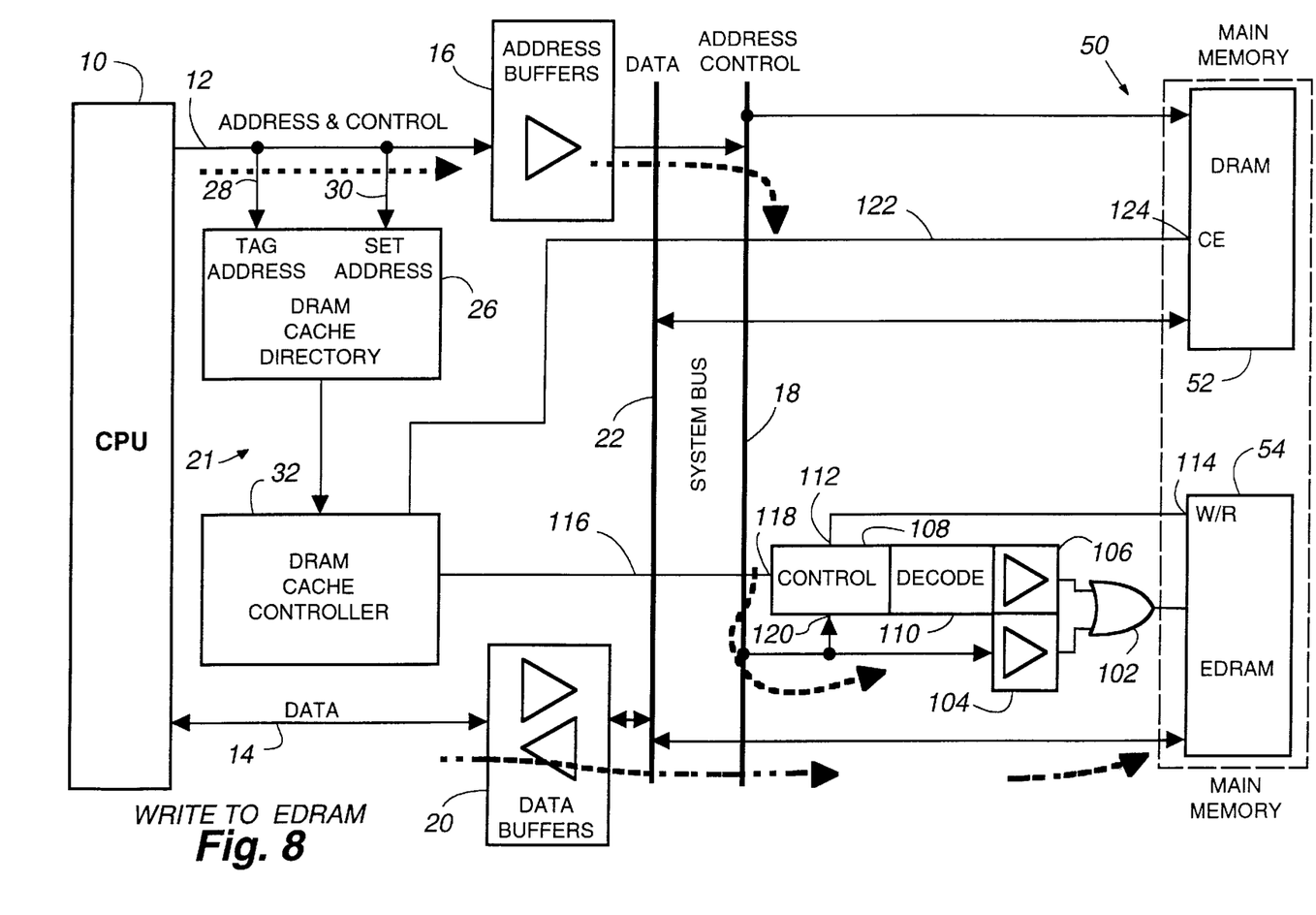
FIG. 8 is hardware block diagram of the computer system of FIG. 2 showing the operation of the system resulting from a write to the EDRAM.

The processing of read and write requests to the noncache portion of the EDRAM 54 is shown in FIGS. 8 and 9. Memory accesses to the EDRAM 54 are handled internal to EDRAM 54 as disclosed in the above-mentioned "Specialty Memory Products Data Book." The DRAM directory 26 has a window feature which causes it to reject analysis of any address on the local bus which does not fall within the range of valid DRAM addresses, in this case, 4–8 Mbytes, resulting in the DRAM cache controller 32 deselecting the DRAM 52. In addition, the DRAM cache controller 32 sends a NOP signal on line 116 to EDRAM-cache control unit 108 which causes read or write commands present at address and command input 120 to be passed to the EDRAM w/R input 112. The EDRAM-cache control unit 108 also disables the decoded address buffers 106, and enables the address buffers 104 to pass an EDRAM address from the system bus 18 to the EDRAM address input.

Having described and illustrated the principles of the invention in a preferred embodiment thereof, it will be appreciated by those skilled in the art that the invention can be modified in arrangement and detail without departing from such principles. For example, other types of caching policies such as write back can be implemented using conventional hardware and without departing from the principles of the invention. A write back policy can be accomplished, for instance, by configuring the DRAM cache controller 32 to manage writes to DRAM cache 56 only when data present in that DRAM cache is being read.

I claim:

1. A memory device, comprising:

first memory components mapped into first main memory address locations;

an enhanced dynamic random access memory (EDRAM) having an integrated EDRAM cache and a dynamic memory array, whereby when said EDRAM is addressed, data is read from said EDRAM cache if it is contained in said EDRAM cache, and moved to and read from said EDRAM cache if it is not contained in said EDRAM cache;

said EDRAM having at least some dynamic memory array addresses mapped into second main memory address locations, and at least some other dynamic memory array addresses allocated as a secondary cache for said first memory components;

and a secondary cache controller for addressing said secondary cache if data to be read from said first memory components is contained in said secondary cache, and to move said data to be read from said first memory components to said secondary cache if said data is not contained in said secondary cache, then to address said secondary cache;

whereby said data to be read from said first memory components is read from said EDRAM.

2. The memory device of claim 1 wherein said secondary cache controller comprises a secondary cache directory for containing addresses of data in said first memory components that are also contained in said secondary cache.

3. The memory device of claim 2 wherein said secondary cache controller comprises a decoder for mapping addresses of said first memory components to addresses of said secondary cache.

4. The memory device of claim 1 wherein said secondary cache controller comprises a circuit for applying addresses within said second main memory address locations directly to said EDRAM.

5. The memory device of claim 1 wherein said first memory components are DRAM devices.

6. The memory device of claim 5 wherein said at least some dynamic memory array addresses of said EDRAM are mapped from 0 to 640 Kbytes and from 1 to 4 Mbytes, and wherein said first memory components are mapped from 4 to 8 Mbytes, and wherein said secondary cache is located between 640 Kbyte and 1 Mbyte.

7. The memory device of claim 5 wherein said at least some dynamic memory array addresses of said EDRAM overlap an address region in which at least some of said first memory components are mapped.

8. The memory device of claim 7 wherein said addresses of said EDRAM which overlap an address region in which at least some of said first memory components are mapped are used as said secondary cache.

9. A method for providing a main memory for a computer, comprising;

mapping first memory components into first main memory address locations;

mapping at least some dynamic memory array addresses of an enhanced dynamic random access memory (EDRAM) into second main memory address locations;

allocating at least some other dynamic memory array addresses of said EDRAM to a secondary cache for said first memory components;

addressing said secondary cache if data to be read from said first memory components is contained in said secondary cache, and moving data to be read from said first memory components to said secondary cache if said data is not contained in said secondary cache, then addressing said secondary cache.

10. The method of claim 9 further comprising providing a secondary cache directory for containing addresses of data in said first memory components that are also contained in said secondary cache.

11. The method of claim 9 further comprising mapping addresses of said first memory components to addresses of said secondary cache.

12. The method of claim 9 further comprising applying addresses within said second main memory address locations directly to said EDRAM.

13. A computer system having a CPU and a main memory, comprising:

first memory components mapped into first main memory address locations;

an enhanced dynamic random access memory (EDRAM) having an integrated EDRAM cache and a dynamic memory array, in which data is read from said EDRAM cache when the data is contained in said EDRAM cache, and in which data is moved to and read from said EDRAM cache when the data is not contained in said EDRAM cache;

said EDRAM having at least some dynamic memory array addresses mapped into second main memory address locations, and at least some other dynamic memory array addresses allocated as a secondary cache for said first memory components;

and a secondary cache controller for addressing said secondary cache if data to be read from said first memory components is contained in said secondary cache, and to move said data to be read from said first memory components to said secondary cache if said data is not contained in said secondary cache, then to address said secondary cache;

whereby said data to be read from said first memory components is read from said EDRAM.

14. The computer system of claim 13 wherein said secondary cache controller comprises a secondary cache directory for containing addresses of data in said first memory components that are also contained in said secondary cache.

15. The computer system of claim 14 wherein said secondary cache controller comprises a decoder for mapping addresses of said first memory components to addresses of said secondary cache.

16. The computer system of claim 13 wherein said secondary cache controller comprises a circuit for applying addresses within said second main memory address locations directly to said EDRAM.

17. The computer system of claim 13 wherein said first memory components are DRAM devices.

18. The computer system of claim 17 wherein said at least some dynamic memory array addresses of said EDRAM are mapped from 0 to 640 Kbytes and from 1 to 4 Mbytes, and wherein said first memory components are mapped from 4 to 8 Mbytes, and wherein said secondary cache is located between 640 Kbyte and 1 Mbyte.

19. The computer system of claim 17 wherein said at least some dynamic memory array addresses of said EDRAM overlap an address region in which at least some of said first memory components are mapped.

20. The computer system of claim 19 wherein said addresses of said EDRAM which overlap an address region in which at least some of said first memory components are mapped are used as said secondary cache.

21. The computer system of claim 20 wherein said at least some dynamic memory array addresses of said EDRAM are mapped into main memory address locations below 8 Mbytes, said first memory components are mapped into main memory address locations above 6 Mbytes, and said at least some other dynamic memory array addresses of said EDRAM between 6 and 8 Mbytes.

22. In a computer system comprising a central processing unit operatively associated with a main memory having addresses designating data stored in a dynamic random access memory (DRAM) and addresses designating data stored in a first portion of an enhanced dynamic random access memory (EDRAM), a method for providing a caching capability for the DRAM, comprising:

designating a second portion of the EDRAM as a cache portion for the DRAM; and responding to a request to read data from a specific DRAM address by reading said data from said cache portion if said data is contained in said cache portion, and by copying said data to said cache portion if said data is not contained in said cache portion.

23. The method of claim 22 further comprising responding to a request to write data to a specific DRAM address by writing said data to said specific DRAM address and by writing said data to said cache portion.

\* \* \* \* \*